US012594716B2

(12) United States Patent
Tsukada et al.

(10) Patent No.: US 12,594,716 B2
(45) Date of Patent: Apr. 7, 2026

(54) SHAPING METHOD AND SHAPING DEVICE

(71) Applicant: FUJI CORPORATION, Chiryu (JP)

(72) Inventors: Kenji Tsukada, Toyota (JP); Tasuku Takeuchi, Kariya (JP); Ryojiro Tominaga, Okazaki (JP)

(73) Assignee: FUJI CORPORATION, Chiryu (JP)

( * ) Notice: Subject to any disclaimer, the term of this patent is extended or adjusted under 35 U.S.C. 154(b) by 363 days.

(21) Appl. No.: 17/613,636

(22) PCT Filed: Jun. 14, 2019

(86) PCT No.: PCT/JP2019/023641
§ 371 (c)(1),
(2) Date: Nov. 23, 2021

(87) PCT Pub. No.: WO2020/250416
PCT Pub. Date: Dec. 17, 2020

(65) Prior Publication Data
US 2022/0227043 A1      Jul. 21, 2022

(51) Int. Cl.
*B33Y 10/00* (2015.01)
*B29C 64/165* (2017.01)
(Continued)

(52) U.S. Cl.
CPC .......... *B29C 64/165* (2017.08); *B29C 64/209* (2017.08); *B29C 64/218* (2017.08);
(Continued)

(58) Field of Classification Search
CPC ... B29C 64/165; B29C 64/264; B29C 64/295; B29C 64/209; B29C 64/218;
(Continued)

(56) References Cited

U.S. PATENT DOCUMENTS 9,891,346 B2 * 2/2018 Van De Vrie ............ G02B 1/00
2015/0093544 A1 * 4/2015 Van De Vrie .......... B33Y 10/00
428/156
(Continued)

FOREIGN PATENT DOCUMENTS

EP       3 354 459 A1    8/2018
JP       2013-67118 A    4/2013
(Continued)

OTHER PUBLICATIONS

International Search report issued on Sep. 3, 2019 in PCT/JP2019/023641 filed Jun. 14, 2019, 1 page.

*Primary Examiner* — John J DeRusso
*Assistant Examiner* — Shibin Liang
(74) *Attorney, Agent, or Firm* — Oblon, McClelland, Maier & Neustadt, L.L.P.

(57) ABSTRACT

A shaping method includes a first ejection step of ejecting a first curable viscous fluid, a planarization step of planarizing the first curable viscous fluid, a first curing step of curing the first curable viscous fluid, a cured layer forming step of repeatedly executing the first ejection step, the planarization step, and the first curing step to form a cured layer, a second ejection step of ejecting a second curable viscous fluid onto a surface of the cured layer, a second curing step of forming a smooth surface on the surface of the cured layer by curing the second curable viscous fluid, a third ejection step of ejecting a fluid containing metal particles onto the smooth surface, and a third curing step of curing the fluid containing the metal particles ejected in the third ejection step to form a metallic conductor on the smooth surface.

5 Claims, 8 Drawing Sheets

(51) Int. Cl.

| | |
|---|---|
| *B29C 64/209* | (2017.01) |
| *B29C 64/218* | (2017.01) |
| *B29C 64/264* | (2017.01) |
| *B29C 64/295* | (2017.01) |
| *B29C 64/336* | (2017.01) |
| *B29K 105/00* | (2006.01) |
| *B29L 31/34* | (2006.01) |
| *B33Y 30/00* | (2015.01) |
| *B33Y 70/10* | (2020.01) |
| *B33Y 80/00* | (2015.01) |

(52) U.S. Cl.

CPC .......... *B29C 64/264* (2017.08); *B29C 64/295* (2017.08); *B29C 64/336* (2017.08); *B33Y 10/00* (2014.12); *B33Y 30/00* (2014.12); *B33Y 70/10* (2020.01); *B29K 2105/251* (2013.01); *B29K 2995/0007* (2013.01); *B29K 2995/0073* (2013.01); *B29L 2031/34* (2013.01); *B33Y 80/00* (2014.12)

(58) Field of Classification Search

CPC ... B29C 64/336; B29C 67/0059; B33Y 10/00; B33Y 30/00; B33Y 70/10; B33Y 80/00; B29K 2105/251; B29K 2995/0007; B29K 2995/0073; B29L 2031/34

See application file for complete search history.

(56) References Cited

U.S. PATENT DOCUMENTS

| | | | |
|---|---|---|---|
| 2015/0131025 A1 | 5/2015 | Ota | |
| 2016/0114529 A1 | 4/2016 | Nakamura | |
| 2017/0203508 A1 | 7/2017 | Dikovsky et al. | |
| 2017/0239890 A1 | 8/2017 | Folkins et al. | |
| 2017/0274587 A1* | 9/2017 | Hakkaku | B29C 64/277 |
| 2020/0023580 A1* | 1/2020 | Kaiba | B29C 67/00 |
| 2020/0361146 A1* | 11/2020 | Zhou | B29C 64/209 |

FOREIGN PATENT DOCUMENTS

| | | |
|---|---|---|
| JP | 2015-94881 A | 5/2015 |
| JP | 2016-78405 A | 5/2016 |
| JP | 2017-516295 A | 6/2017 |

* cited by examiner

Y-Axis DIRECTION

X-Axis DIRECTION

SHAPING METHOD AND SHAPING DEVICE

TECHNICAL FIELD

The present disclosure relates to a shaping method and a shaping device for performing shaping by using a curable viscous fluid and a fluid containing metal particles.

BACKGROUND ART

In the conventional art, a technique for forming a structure with a curable viscous fluid such as an ultraviolet curable resin has been developed. Specifically, a curable viscous fluid is ejected by an ejection device, and is cured by irradiating the curable viscous fluid with ultraviolet light or the like. Consequently, a cured layer of the curable viscous fluid is formed. Patent Literature 1 discloses a technique in which a curable viscous fluid is ejected and then a surface of the ejected curable viscous fluid is planarized by a planarization device such as a roller.

Patent Literature

Patent Literature 1: JP-A-2013-67118

BRIEF SUMMARY

Technical Problem

Fine unevenness may be formed on a surface of a curable viscous fluid planarized by a planarization device. For example, unevenness caused by a size of liquid droplets of the curable viscous fluid is formed on the surface. A height difference between the unevenness caused by the size of the liquid droplets of the curable viscous fluid may be, for example, $\pm 10$ µm (micrometer), and is extremely small compared with a size of a roller or the like. Thus, in a planarization device such as a roller, sufficient planarization cannot be performed, and thus there is concern that fine unevenness may be left on the surface of the curable viscous fluid after a planarization process is executed.

Here, in a case where a metallic conductor is shaped by ejecting and curing a fluid containing metal particles on a surface of a cured layer in which a planarized curable viscous fluid is cured, a thickness of the shaped conductor is made nonuniform due to unevenness of the surface. As a result, there is concern that a portion having a thickness may not be sufficiently metallized to the inside during baking, a resistance value may be made nonuniform due to a variation in the thickness of the conductor, or the high-frequency characteristic of the conductor may deteriorate.

The present disclosure has been made in view of such circumstances, and an object thereof is to provide a shaping method and a shaping device capable of achieving both planarization of a cured layer shaped from a curable viscous fluid and improvement of characteristics of a conductor shaped from a fluid containing metal particles.

Solution to Problem

In order to achieve the object, according to the present disclosure, there is provided a shaping method including a first ejection step of ejecting a first curable viscous fluid; a planarization step of planarizing, by a planarization device, the first curable viscous fluid ejected in the first ejection step; a first curing step of curing the first curable viscous fluid planarized in the planarization step; a cured layer forming step of repeatedly executing the first ejection step, the planarization step, and the first curing step to form a cured layer; a second ejection step of ejecting a second curable viscous fluid onto a surface of the cured layer; a second curing step of forming a smooth surface on the surface of the cured layer by curing the second curable viscous fluid ejected in the second ejection step without planarizing the second curable viscous fluid by the planarization device; a third ejection step of ejecting a fluid containing metal particles onto the smooth surface; and a third curing step of curing the fluid containing the metal particles ejected in the third ejection step to form a metallic conductor on the smooth surface.

In order to achieve the object, according to the present disclosure, there is provided a shaping device including an ejection device; a planarization device; a curing device; and a control device, in which the control device includes a first ejection section configured to cause the ejection device to eject a first curable viscous fluid, a planarization section configured to cause the planarization device to planarize the first curable viscous fluid ejected by the first ejection section, a first curing section configured to cause the curing device to cure the first curable viscous fluid planarized by the planarization section, a cured layer forming section configured to repeatedly execute processes performed by the first ejection section, the planarization section, and the first curing section to form a cured layer, a second ejection section configured to cause the ejection device to eject a second curable viscous fluid onto a surface of the cured layer, a second curing section configured to cause the curing device to cure the second curable viscous fluid ejected by the second ejection device to form a smooth surface on the surface of the cured layer without planarizing the second curable viscous fluid by the planarization device, a third ejection section configured to cause the ejection section to eject a fluid containing metal particles onto the smooth surface, and a third curing section configured to cause the curing device to cure the fluid containing the metal particles ejected by the third ejection section to form a metallic conductor on the smooth surface.

Advantageous Effects

According to such a configuration, the first ejection step, the planarization step, and the first curing step are repeatedly executed to form a cured layer having a planarized surface. Fine unevenness that cannot be eliminated by the planarization device may be formed on the planarized surface of the cured layer. Therefore, the second curable viscous fluid is ejected onto the surface of the cured layer, and the ejected second curable viscous fluid is cured without being planarized by the planarization device. Consequently, the second curable viscous fluid ejected on the surface of the cured layer is spread over the fine unevenness of the surface of the cured layer due to the leveling effect, and is smoothed to form, for example, a smooth surface having surface unevenness of $\pm 1$ µm or less. By ejecting a fluid containing metal particles onto the smooth surface and curing the fluid, a conductor having a more uniform thickness (having higher electrical characteristics) can be formed on the cured layer.

DESCRIPTION OF EMBODIMENTS (1. Configuration of Shaping Device 10)

Figure 1:
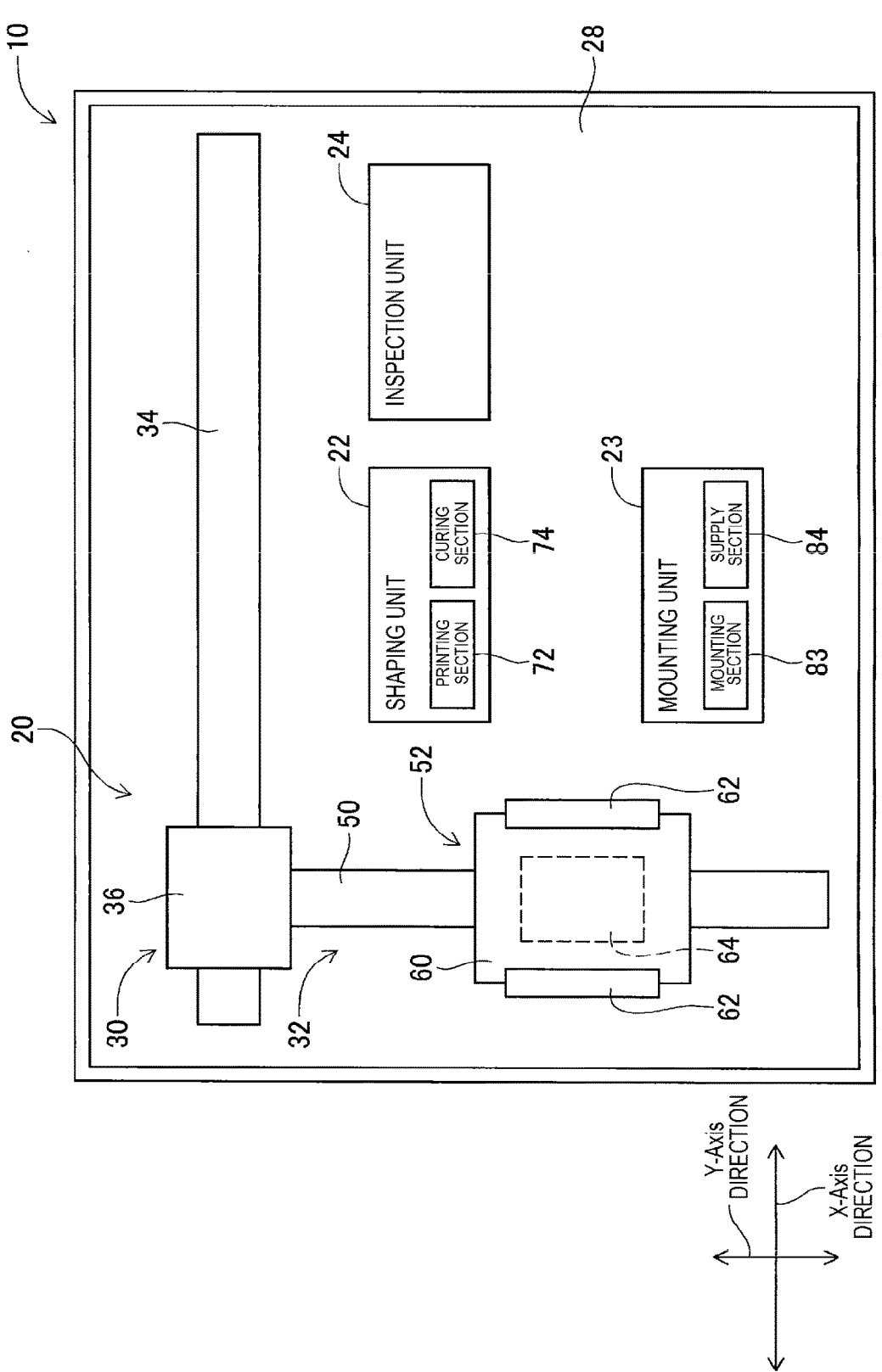
FIG. 1 is a diagram illustrating a shaping device of the present embodiment.

FIG. 1 illustrates shaping device 10 of one embodiment embodying a shaping device of the present disclosure. Shaping device 10 of the present embodiment includes conveyance device 20, shaping unit 22, mounting unit 23, inspection unit 24, and control device 26 (refer to FIG. 2). Conveyance device 20, shaping unit 22, mounting unit 23, and inspection unit 24 are disposed on base 28 of shaping device 10. Base 28 generally has a rectangular shape. In the following description, a longitudinal direction of base 28 will be referred to as an X-axis direction, a lateral direction of base 28 will be referred to as a Y-axis direction, and a direction orthogonal to both of the X-axis direction and the Y-axis direction will be referred to as a Z-axis direction.

Conveyance device 20 includes X-axis slide mechanism 30 and Y-axis slide mechanism 32. X-axis slide mechanism 30 includes X-axis slide rail 34 and X-axis slider 36. X-axis slide rail 34 is disposed to extend in the X-axis direction on base 28. X-axis slider 36 is held by X-axis slide rail 34 to be slidable in the X-axis direction. X-axis slide mechanism 30 further includes electromagnetic motor 38 (refer to FIG. 2), and moves X-axis slider 36 to any position in the X-axis direction by driving electromagnetic motor 38.

Y-axis slide mechanism 32 includes Y-axis slide rail 50 and stage 52. Y-axis slide rail 50 is disposed to extend in the Y-axis direction on base 28. One end part of Y-axis slide rail 50 in the Y-axis direction is coupled to X-axis slider 36. Consequently, Y-axis slide rail 50 is configured to be movable in the X-axis direction in accordance with sliding movement of X-axis slider 36. Stage 52 is held to be slidable in the Y-axis direction by Y-axis slide rail 50. Y-axis slide mechanism 32 has electromagnetic motor 56 (refer to FIG. 2), and moves stage 52 to any position in the Y-axis direction by driving electromagnetic motor 56. Consequently, stage 52 can be moved to any position in the X-axis direction and the Y-axis direction on base 28 by driving X-axis slide mechanism 30 and Y-axis slide mechanism 32.

Stage 52 has base plate 60, holding devices 62, and lifting/lowering device 64. Base plate 60 is formed in a flat plate shape, and base member 70 (refer to FIG. 4) is placed on an upper surface thereof. Base member 70 is, for example, a plate made of a metal such as iron or stainless steel. Holding devices 62 are provided on both sides of base plate 60 in the X-axis direction. Both edges in the X-axis direction of base member 70 placed on base plate 60 are sandwiched by holding device 62, and thus base member 70 is fixedly held to base plate 60. Lifting/lowering device 64 is disposed below base plate 60 to move up and down base plate 60 in the Z-axis direction.

Figure 4:
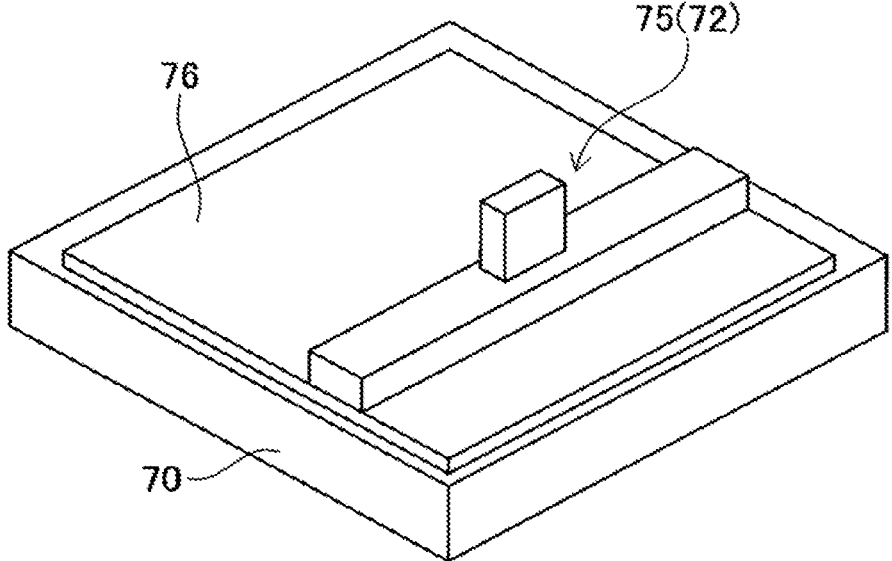
FIG. 4 is a schematic diagram illustrating a state in which an ultraviolet curable resin is being ejected from an ink jet head.

Shaping unit 22 is a unit that shapes a structure on base member 70 placed on base plate 60 of stage 52, and includes printing section 72 and curing section 74. As illustrated in FIG. 4, printing section 72 has ink jet head 75, and ejects a fluid in a thin film form on base member 70 placed on base plate 60. As the fluid ejected by ink jet head 75, ultraviolet curable resin 76 (refer to FIG. 4) that is cured by ultraviolet light may be employed. Ultraviolet curable resin 76 is an example of first and second curable viscous fluids of present application. As the curable viscous fluid, other viscous fluids such as a thermosetting resin may be employed in addition to an ultraviolet curable resin.

Figure 11:
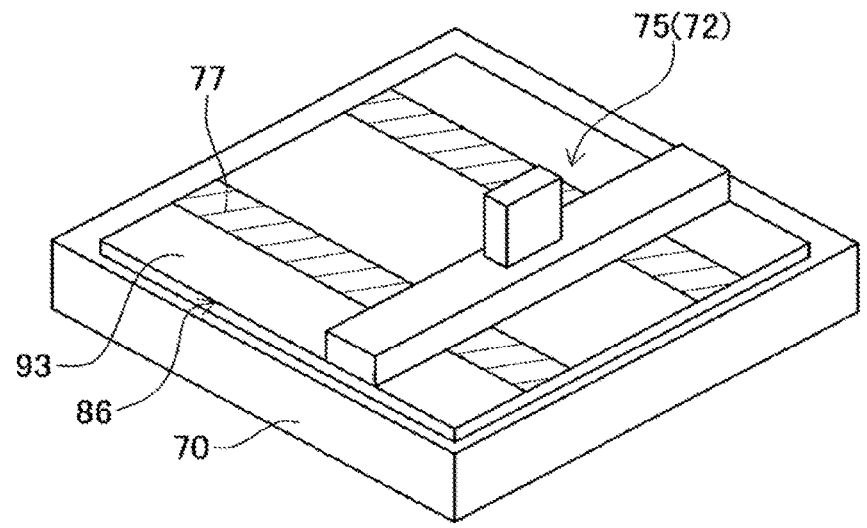
FIG. 11 is a schematic diagram illustrating a state in which metal ink is being ejected on a smooth surface.

In addition to ultraviolet curable resin 76, ink jet head 75 is configured to be capable of ejecting, for example, metal ink 77 (refer to FIG. 11). Metal ink 77 is an example of a fluid containing metal particles of present application. Metal ink 77 is, for example, one in which fine particles of a metal (silver or the like) having a nanometer size are dispersed in a solvent, and is baked and cured by heat. A surface of the metal fine particle is coated with, for example, a dispersant to suppress aggregation in the solvent.

In a case of ejecting ultraviolet curable resin 76, ink jet head 75 ejects ultraviolet curable resin 76 from multiple nozzles according to, for example, a piezo method using piezoelectric elements, or ejects ultraviolet curable resin 76 from multiple nozzles according to a thermal method in which air bubbles are generated by heating ultraviolet curable resin 76 and ejected from nozzles. In a case of ejecting metal ink 77, ink jet head 75 ejects metal ink 77 from multiple nozzles, for example, according to a piezo method using piezoelectric elements. An ejection device is not limited to ink jet head 75 including multiple nozzles, and may be, for example, a dispenser including a single nozzle. Ink jet head 75 may separately include a nozzle ejecting metal ink 77 and a nozzle ejecting ultraviolet curable resin 76, or may share a nozzle ejecting two viscous fluids. In the following description, ultraviolet curable resin 76 and metal ink 77 may be collectively referred to as a viscous fluid.

Figure 2:
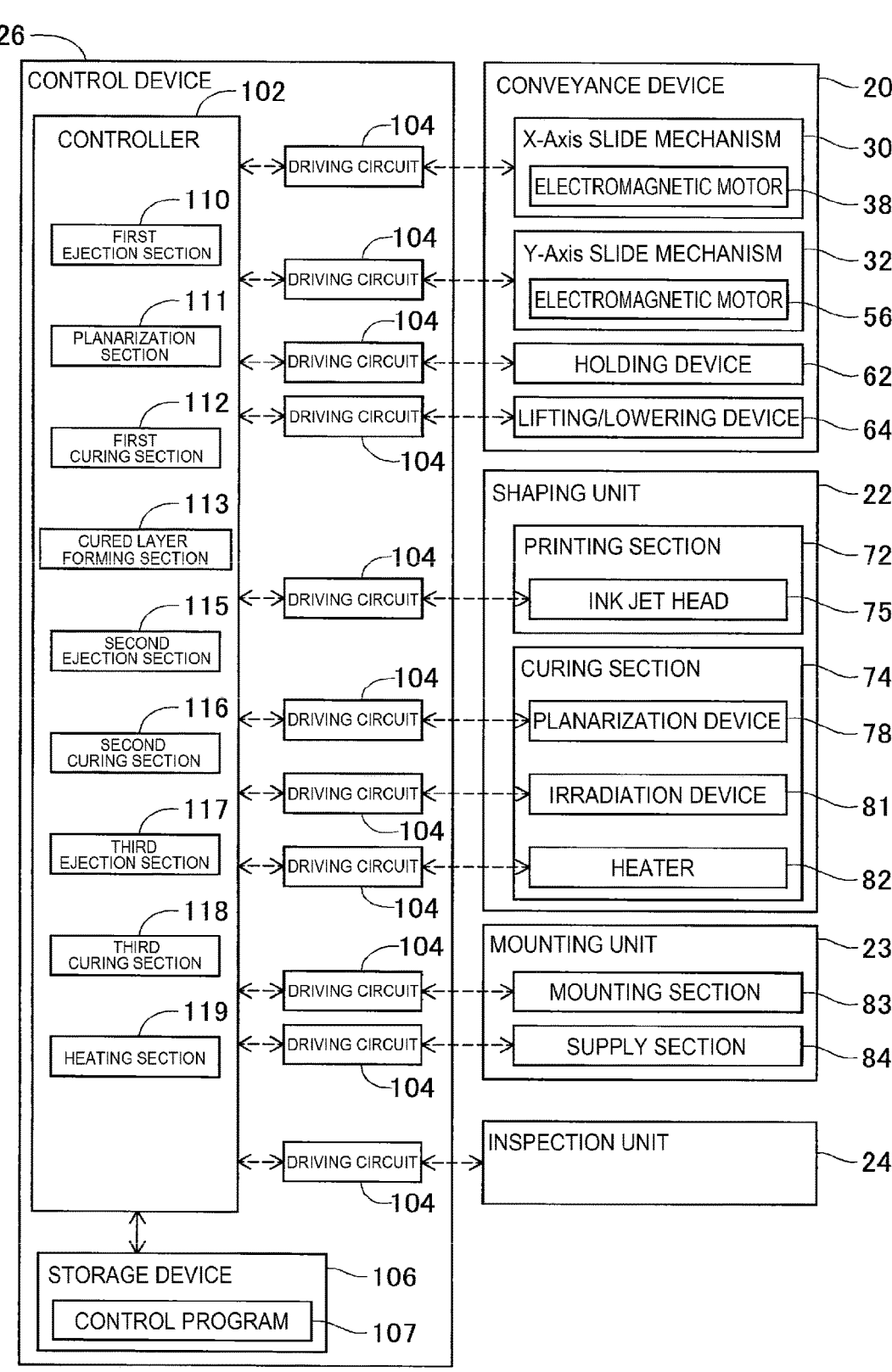
FIG. 2 is a block diagram illustrating a control device.
Figure 5:
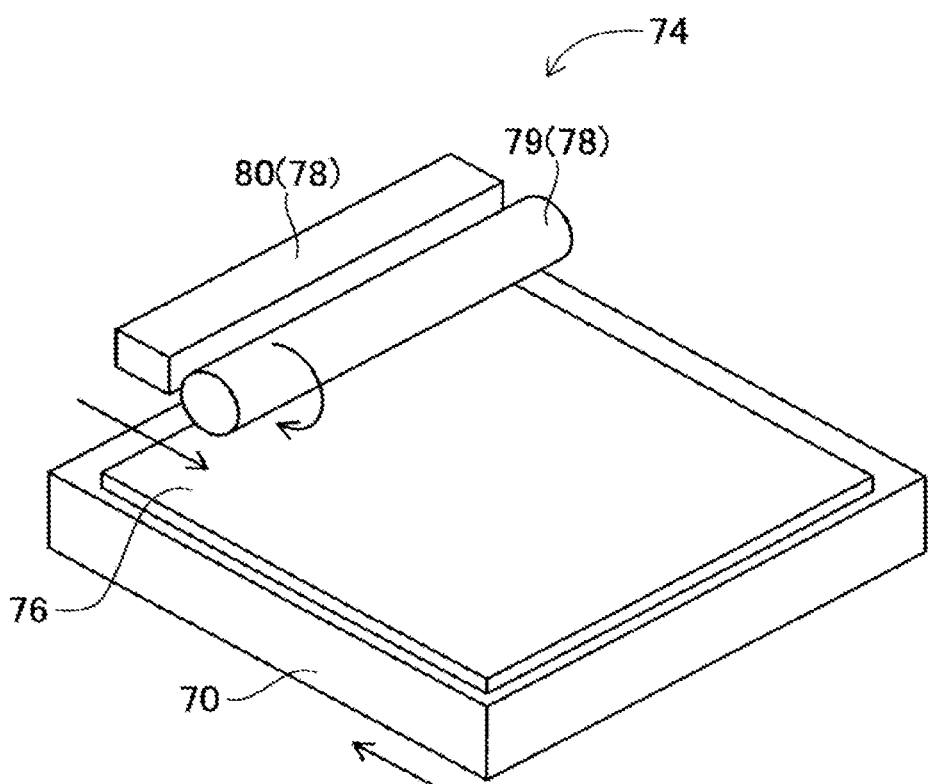
FIG. 5 is a schematic diagram illustrating a state in which an ultraviolet curable resin is being planarized by a planarization device.

As illustrated in FIG. 2, curing section 74 includes planarization device 78, irradiation device 81, and heater 82. Planarization device 78 is a device planarizing an upper surface of ultraviolet curable resin 76 or metal ink 77 ejected on base member 70 by ink jet head 75. Planarization device 78 includes roller 79 and collection section 80 (refer to FIG. 5). Roller 79 has, for example, a cylindrical shape, and, based on control of planarization device 78, moves while rotating on a surface of a viscous fluid (ultraviolet curable resin 76 or metal ink 77) in a flowable state to planarize the surface. Collection section 80 has, for example, a blade protruding toward a surface of roller 79, and stores and discharges the viscous fluid scraped by the blade. Collection section 80 discharges, for example, the collected viscous fluid to a waste liquid tank. Planarization device 78 planarizes the surface of the viscous fluid by scraping the excess viscous fluid while leveling the surface of the viscous fluid.

Planarization device 78 is not limited to a configuration in which planarization is performed by roller 79. For example, planarization device 78 may have a configuration in which a plate-shaped member such as a squeegee comes into contact with the surface of the viscous fluid to perform planarization. Alternatively, planarization device 78 may have a configuration for leveling the surface of the viscous fluid by using a brush or a rake. Collection section 80 may return the collected viscous fluid to a supply tank again. The planarization by planarization device 78 may not be performed every time the viscous fluid is ejected. For example, the planarization may be performed only when a specific layer is formed.

Figure 3:
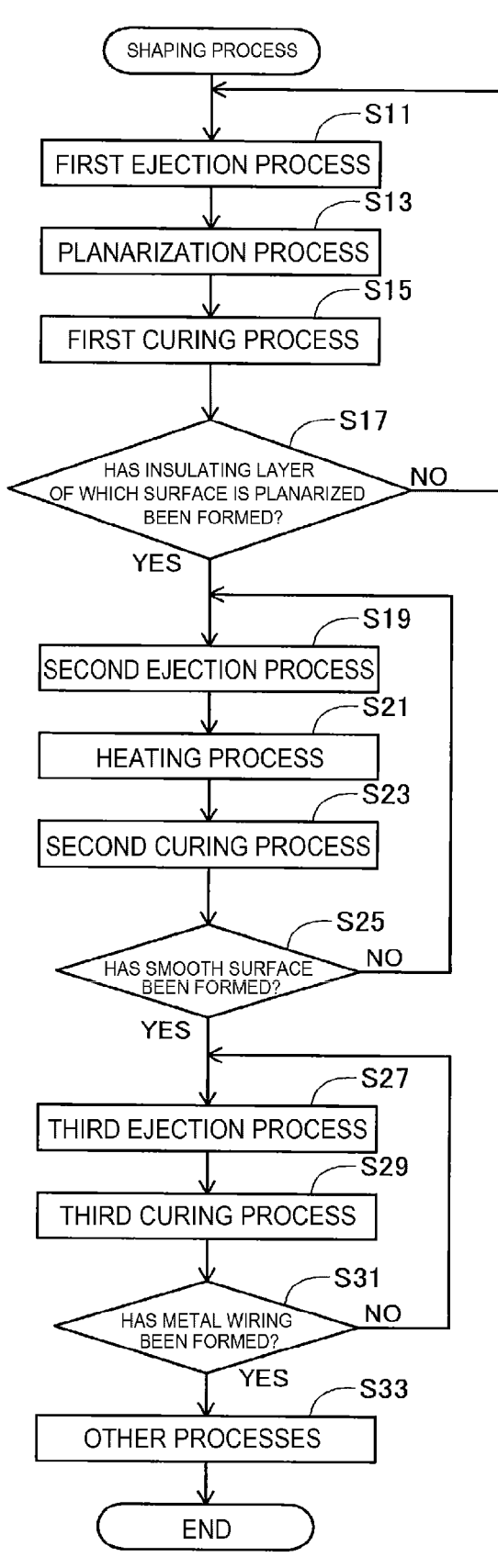
FIG. 3 is a flowchart illustrating details of a shaping process.

Irradiation device 81 irradiates, for example, ultraviolet curable resin 76 ejected on base member 70 with ultraviolet light. Ultraviolet curable resin 76 is cured due to irradiation with the ultraviolet light to form insulating layer 86 in the thin film form (refer to FIGS. 6 and 7). Heater 82 is a device heating the ejected ultraviolet curable resin 76 or metal ink 77. Ultraviolet curable resin 76 of the present embodiment has a property in which viscosity is reduced by being heated. In a heating process (refer to S21 in FIG. 3) that will be described later, shaping device 10 heats ultraviolet curable resin 76 to reduce the viscosity, and thus more effectively performs smoothing.

Metal ink 77 is baked by heat being applied from heater 82 to form a metal wiring. Baking of metal ink 77 is, for example, a phenomenon in which evaporation of a solvent or decomposition of a protective film of metal fine particles, that is, a dispersant is performed by applying energy, so that conductivity is increased by contacting or fusing the metal fine particles. A metal wiring may be formed by baking the metal ink. Details of a shaping method will be described later. A device that heats metal ink 77 is not limited to heater 82. For example, shaping device 10 may include a laser irradiation device that irradiates metal ink 77 with laser light as a device that heats metal ink 77, or an atmosphere furnace that heats insulating layer 86 on which metal ink 77 is ejected inside the furnace.

Mounting unit 23 illustrated in FIG. 1 is, for example, a unit that mounts various electronic components connected to the metal wiring shaped by shaping unit 22, and includes mounting section 83 and supply section 84. Mounting section 83 has, for example, a suction nozzle (not illustrated) that picks up an electronic component, and mounts the electronic component held by the suction nozzle. Supply section 84 has, for example, multiple tape feeders that feed taped electronic components one by one, and supplies the electronic components to mounting section 83. Supply section 84 is not limited to the configuration including the tape feeder, and may be a tray-type supply device that picks up an electronic component from a tray and supplies the electronic component.

For example, when base member 70 is moved to a position below mounting section 83 in accordance with movement of stage 52, mounting unit 23 moves mounting section 83 to a component supply position of supply section 84, and drives supply section 84 to supply a necessary component. Mounting section 83 picks up and holds the electronic component from the component supply position of supply section 84 by using the suction nozzle, and mounts the electronic component on insulating layer 86 shaped on base member 70.

Inspection unit 24 is a unit that inspects a structure shaped by shaping unit 22 and mounting unit 23. Inspection unit 24 includes, for example, an imaging device such as a camera. Control device 26 may determine whether an electronic component is normally mounted based on image data captured by inspection unit 24.

Inspection unit 24 of the present embodiment includes a device for inspecting smooth surface 93 (refer to FIG. 10) that will be described later. For example, inspection unit 24 includes a confocal laser microscope capable of measuring a surface roughness of smooth surface 93. Based on a result measured by the confocal laser microscope of inspection unit 24, control device 26 can determine whether the unevenness of smooth surface 93 is favorable, that is, whether smoothing is executed to a desired state. Details of the inspection will be described later. Shaping device 10 does not have to include a device (such as inspection unit 24) inspecting smooth surface 93.

As illustrated in FIG. 2, control device 26 includes controller 102, multiple driving circuits 104, and storage device 106. Multiple driving circuits 104 are connected to electromagnetic motors 38 and 56, holding device 62, lifting/lowering device 64, ink jet head 75, planarization device 78, irradiation device 81, heater 82, mounting section 83, supply section 84, and inspection unit 24. Controller 102 includes a CPU, a ROM, a RAM, and the like, and is mainly a computer, and is connected to multiple driving circuits 104. Storage device 106 includes a RAM, a ROM, a hard disk, and the like, and stores control program 107 for performing control of shaping device 10. Controller 102 may control operations of conveyance device 20, shaping unit 22, and the like by executing control program 107 with the CPU.

Figure 12:
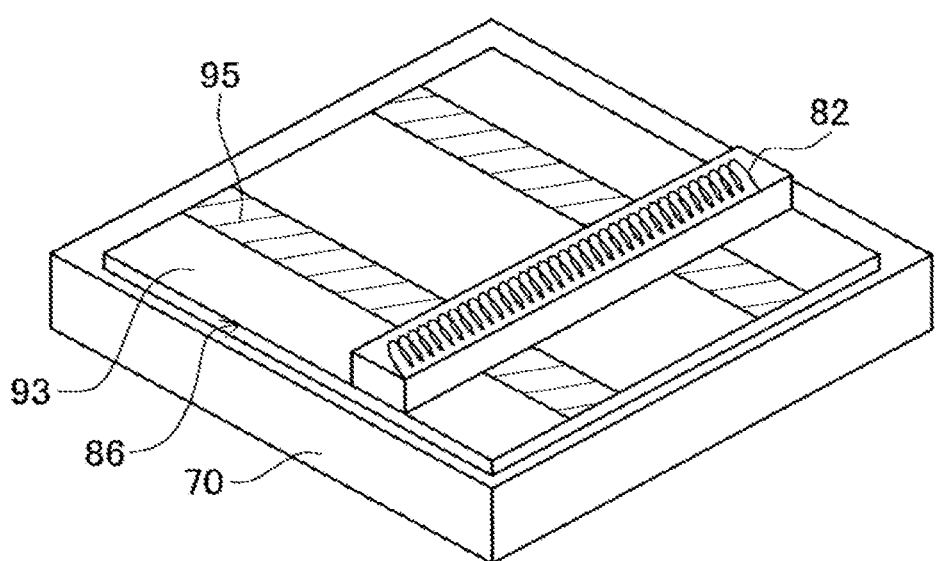
FIG. 12 is a schematic diagram illustrating a state in which a metal wiring is being formed.

According to the configuration described above, shaping device 10 of the present embodiment forms insulating layer 86 (refer to FIG. 7) or metal wiring 95 (refer to FIG. 12) by curing ultraviolet curable resin 76 or metal ink 77 as a viscous fluid. Shaping device 10 can shape a structure having any shape by changing a shape of insulating layer 86 or metal wiring 95. In shaping device 10, an electronic component is mounted by mounting unit 23 in the process of shaping. For example, three-dimensional data of each layer obtained by slicing a structure is set in control program 107. Controller 102 forms a structure by ejecting, curing, or the like a viscous fluid based on data of control program 107. Controller 102 detects information such as a layer or a position where an electronic component is disposed based on the data of control program 107, and mounts the electronic component based on the detected information.

(2. Operation of Shaping Device 10)

In the following description, as an example of an operation of shaping device 10, a shaping process of shaping a metal wiring on an insulating layer will be described. FIG. 2 is a flowchart illustrating details of the shaping process. For example, when an instruction for starting shaping is received, control device 26 executes a predetermined program in control program 107, and starts the shaping process illustrated in FIG. 2. In the following description, the expression that controller 102 executes control program 107 to control each device may be simply referred to as a "device". For example, the expression that "controller 102 moves base plate 60" means that "controller 102 executes control program 107, controls an operation of conveyance device 20 via driving circuit 104, and moves base plate 60 through an operation of conveyance device 20".

First, base member 70 is set on base plate 60 of stage 52. The setting of base member 70 may be performed by a human, or may be automatically executed by shaping device 10. Controller 102 controls conveyance device 20 to move stage 52 on which base member 70 is set to a position below shaping unit 22. In a first ejection process shown in S11 in FIG. 3, controller 102 controls ink jet head 75 of printing section 72 to eject ultraviolet curable resin 76 onto base member 70 (refer to FIG. 4). FIG. 4 is a schematic diagram illustrating a state in which ultraviolet curable resin 76 is being ejected from ink jet head 75. Ink jet head 75 ejects ultraviolet curable resin 76 in a thin film form onto base member 70. Controller 102 may execute ejection using ink jet head 75 in S11, for example, by only one scan (one pass) along the X-axis direction, or may execute ejection by multiple scans.

Next, in a planarization process in S13, controller 102 rotates roller 79 of planarization device 78 on the upper surface of ultraviolet curable resin 76 in the thin film form to perform planarization. As indicated by an arrow in FIG. 5, controller 102 moves roller 79 in a direction opposite to a direction in which base member 70 is moved, and the planarization process is executed in synchronization with operations of base member 70 and roller 79. Roller 79 scrapes up ultraviolet curable resin 76 in a flowable state, collects the ultraviolet curable resin 76 with collection section 80, and planarizes the surface of ultraviolet curable resin 76. Operation directions and the like of base member 70 and roller 79 described above are examples. For example, controller 102 may move roller 79 in the same direction as that of base member 70, or may move only roller 79 while fixing a position of base member 70. Controller 102 may advance roller 79 while rotating roller 79 in the front direction or may advance roller 79 while rotating roller 79 in the rear direction. Alternatively, controller 102 may not rotate roller 79.

Figure 6:
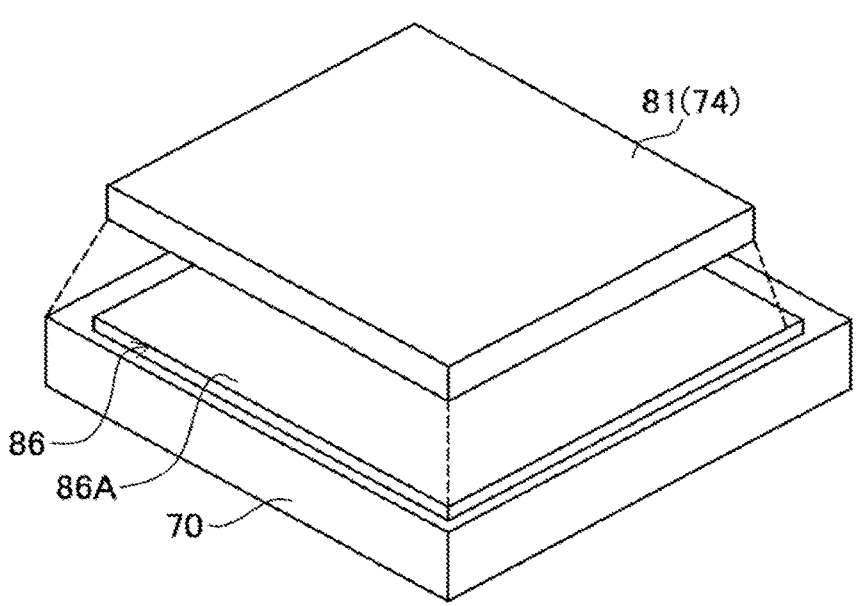
FIG. 6 is a schematic diagram illustrating a state in which a planarized ultraviolet curable resin is being cured by a curing section to form an insulating layer.

Next, in first curing process in S15, controller 102 irradiates planarized ultraviolet curable resin 76 with ultraviolet light by irradiation device 81. As illustrated in FIG. 6, irradiation device 81 cures ultraviolet curable resin 76 by irradiating ultraviolet light to ultraviolet curable resin 76 (refer to FIG. 5) spread in a thin film form to form insulating layer 86 having insulating property. Consequently, insulating layer 86 in which surface 86A is planarized can be formed.

Next, controller 102 determines whether desired insulating layer 86 having planarized surface 86A has been formed (S17). Controller 102 performs a negative determination in S17, for example, until a thickness, a shape, or the like designated by control program 107 or an operation input from the outside is reached (S17: NO). Controller 102 may determine the thickness, the shape, or the like of formed insulating layer 86, for example, based on a size of liquid droplets of ultraviolet curable resin 76 ejected from ink jet head 75, the number of times in which S11 to S15 are executed, and the like. Controller 102 repeatedly executes the processes in S11 to S15 to laminate insulating layer 86, and thus surface 86A is planarized and insulating layer 86 having a desired shape (a thickness, a shape, or the like) is formed. Controller 102 does not have to execute the planarization process in S13 each time S11 is executed. For example, controller 102 may execute the planarization process in S13 each time S11 and S15 are executed multiple times.

When it is determined in S17 that surface 86A is planarized and insulating layer 86 having a desired shape is formed (S17: YES), controller 102 ejects ultraviolet curable resin 76 again onto surface 86A in order to smooth surface 86A of planarized insulating layer 86 in a second ejection process in S19.

Figure 7:
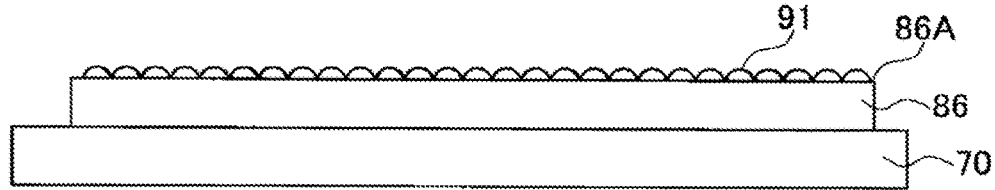
FIG. 7 is a schematic diagram illustrating an insulating layer of which a surface has been planarized.

Here, S11 to S15 are repeatedly executed, and thus insulating layer 86 having planarized surface 86A can be formed. FIG. 7 schematically illustrates an insulating layer 86 of which a surface is planarized. As illustrated in FIG. 7, fine unevenness 91 is formed on surface 86A of planarized insulating layer 86 due to, for example, a difference in an amount of ultraviolet curable resin 76 ejected from the nozzles of ink jet head 75, a size of liquid droplets of ultraviolet curable resin 76, or the like. A height of unevenness 91 may be, for example, ±10 μm, and is extremely small compared with a size of roller 79. Therefore, even if surface 86A of insulating layer 86 is planarized by roller 79, it is difficult to planarize surface 86A to fine unevenness 91. In the present application, the surface on which fine unevenness 91 is formed is defined as a planarized surface. A surface on which fine unevenness 91 is reduced, or the unevenness of the surface is equal to or less than ±1 μm (it can be assumed that original unevenness 91 is eliminated) is defined as a smooth surface that is smoothed.

When unevenness 91 is formed on surface 86A, in a case where a metal wiring is formed on surface 86A, a thickness of the metal wiring to be formed varies. Alternatively, there is concern that the conductivity of the metal wiring may be reduced by not completely baking the metal wiring in a portion having a large thickness (metal fine particles do not contact or fuse). As a result, a resistance value of the metal wiring becomes uniform, and thus it is difficult to obtain a desired high-frequency characteristic.

Figure 8:
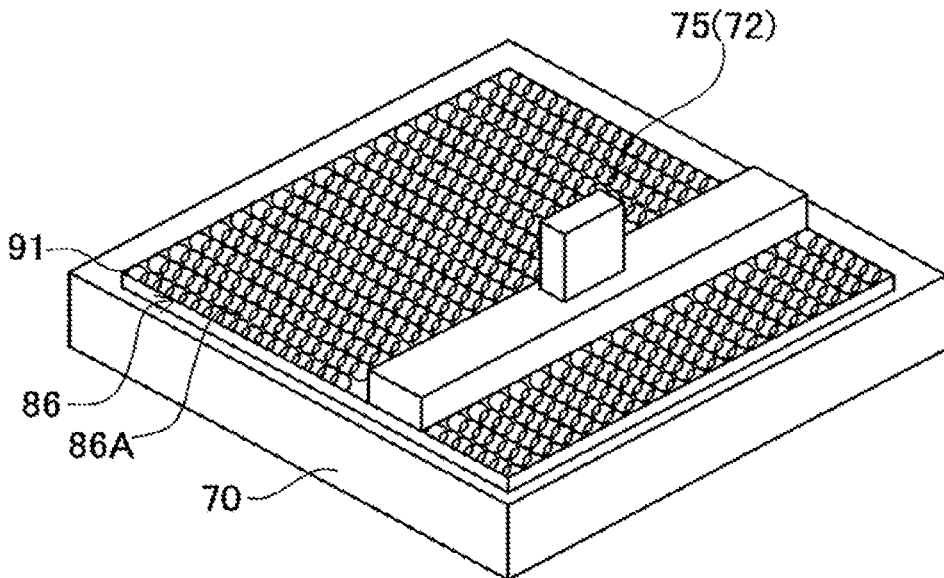
FIG. 8 is a schematic diagram illustrating a state in which a second ultraviolet curable resin is being ejected onto the surface of the insulating layer.

Therefore, controller 102 executes smoothing to reduce or eliminate unevenness 91 by ejecting ultraviolet curable resin 76 again onto planarized surface 86A of insulating layer 86. In the second ejection process in S19 in FIG. 3, controller 102 causes ink jet head 75 to eject ultraviolet curable resin 76 onto planarized surface 86A (refer to FIG. 8). A fine circle in FIG. 8 schematically indicates unevenness 91. In the following description, in a case where ultraviolet curable resin 76 in the first ejection process in S11 is differentiated from ultraviolet curable resin 76 in the second ejection process in S19, ultraviolet curable resin 76 in S19 will be referred to as second ultraviolet curable resin 76A.

Controller 102 sets an ejection amount of the second ultraviolet curable resin 76A in S19 to an amount corresponding to the size of unevenness 91. Controller 102 causes inspection unit 24 to measures a height, a height difference, and the like of unevenness 91, and automatically sets an ejection amount of second ultraviolet curable resin 76A. For example, when the height of formed unevenness 91 is large (a groove is deep), controller 102 executes a process for increasing an ejection amount of ink jet head 75. Alternatively, a user may manufacture a prototype of insulating layer 86, measure a height or the like of unevenness 91, and set the height or the like of unevenness 91 in control program 107. Controller 102 may set an ejection amount of second ultraviolet curable resin 76A based on information such as the height set in control program 107. A method of adjusting an ejection amount of second ultraviolet curable resin 76A may be performed not only by changing an ejection amount per unit area ejected from ink jet head 75, but also by changing, for example, a size of liquid droplets ejected from ink jet head 75, and the number of scans in which ink jet head 75 performs scanning on base plate 60 (base member 70) in one step in S19. Therefore, it is also possible to adjust an ejection amount of second ultraviolet curable resin 76A to an optimal amount (an amount corresponding to the size of unevenness 91) by setting these three conditions in advance.

Therefore, in the second ejection process in S19, controller 102 of the present embodiment ejects second ultraviolet curable resin 76A (an example of a second curable viscous fluid) in an ejection amount corresponding to the size of unevenness 91 formed on surface 86A of insulating layer 86 (an example of a cured layer). According to this, in the second ejection process for performing smoothing, ejection is executed in an ejection amount corresponding to the size of unevenness 91 of surface 86A of insulating layer 86 formed in the first curing process (S15), for example, a height of unevenness 91, a width of unevenness 91, a height difference between unevenness 91, or the like. Consequently, in the second ejection process, second ultraviolet curable resin 76A is ejected in an appropriate amount, and thus unevenness 91 of surface 86A of insulating layer 86 can be smoothed more effectively. Controller 102 may eject second ultraviolet curable resin 76A in a constant ejection amount regardless of the size of unevenness 91. Controller 102 may change an amount other than the ejection amount according to the size of unevenness 91. For example, controller 102 may change the number of executions of S19, the number of scans of ink jet head 75, and the like according to the size of unevenness 91. For example, in a case where unevenness 91 is high (a groove is deep), controller 102 may increase the number of scans of ink jet head 75.

Figure 9:
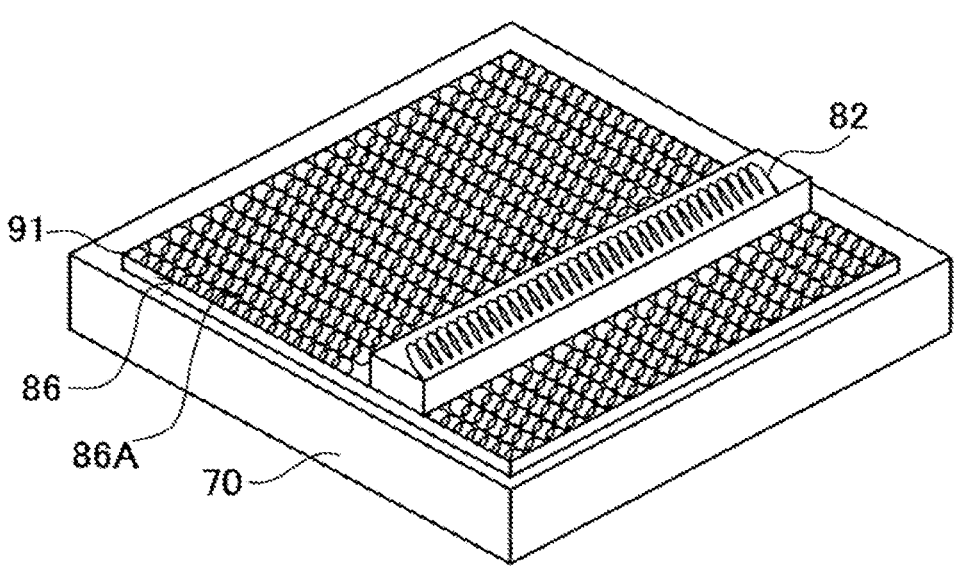
FIG. 9 is a schematic diagram illustrating a state in which the second ultraviolet curable resin is being heated.

Next, as illustrated in FIG. 9, controller 102 causes heater 82 to heat ejected second ultraviolet curable resin 76A (heating process in S21). Second ultraviolet curable resin 76A of the present embodiment has a property that viscosity is reduced by being heated to improve fluidity. In a second curing process in S23 described later, controller 102 cures second ultraviolet curable resin 76A heated in the heating process in S21. That is, controller 102 heats second ultraviolet curable resin 76A before curing second ultraviolet curable resin 76A in a second curing process in S23. By heating second ultraviolet curable resin 76A, it is expected to achieve an effect of reducing the viscosity of second ultraviolet curable resin 76A and increasing the fluidity. Consequently, by increasing the fluidity of second ultraviolet curable resin 76A, second ultraviolet curable resin 76A easily spreads on the surface of unevenness 91, and more easily enters a gap between unevenness 91, and thus smoothing can be performed more effectively.

A method of heating second ultraviolet curable resin 76A is not limited to heater 82 described above. For example, insulating layer 86 on which second ultraviolet curable resin 76A is ejected may be placed in an atmosphere furnace, and second ultraviolet curable resin 76A may be heated. Ink jet head 75 may heat second ultraviolet curable resin 76A before being ejected in the nozzle and then eject heated second ultraviolet curable resin 76A.

Figure 10:
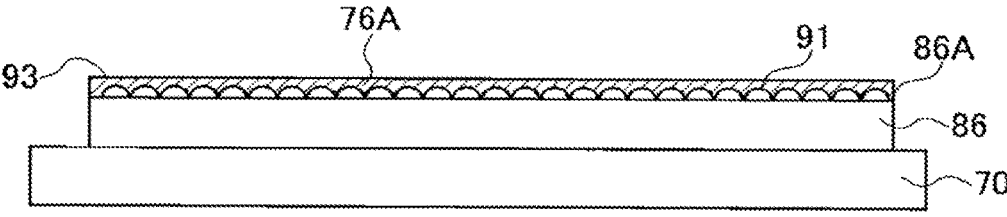
FIG. 10 is a schematic diagram illustrating an insulating layer of which a surface has been smoothed.

Next, controller 102 executes a curing process on heated second ultraviolet curable resin 76A (S23). That is, controller 102 executes the curing process on second ultraviolet curable resin 76A without executing a planarization process using roller 79. Controller 102 irradiates second ultraviolet curable resin 76A ejected onto surface 86A with ultraviolet light from irradiation device 81 to execute curing (refer to FIG. 6). Consequently, as illustrated in FIG. 10, second ultraviolet curable resin 76A ejected on surface 86A is spread over fine unevenness 91 of surface 86A due to a leveling effect and is smoothed to form smooth surface 93. The leveling effect as described herein is a phenomenon in which a surface area of a liquid is as small as possible by the surface tension. Depending on the viscosity of a liquid, a thin film made of second ultraviolet curable resin 76A changes in thickness to be planarized (more uniform) over time. Second ultraviolet curable resin 76A is applied and spread by being ejected onto surface 86A so as to fill unevenness 91. Second ultraviolet curable resin 76A is irradiated with ultraviolet light to increase the viscosity, so that it is cured to fill unevenness 91. Consequently, formed smooth surface 93 is a surface in which unevenness 91 is reduced or a surface in which unevenness 91 is eliminated.

Next, controller 102 determines whether a desired smooth surface 93 has been formed (S25). For example, when the processes in S19 to S23 are repeatedly executed a preset number of times, controller 102 performs an affirmative determination in S25 (S25: YES). In this case, controller 102 may form a layer (smooth surface 93) of second ultraviolet curable resin 76A having a desired thickness and shape by performing a negative determination in S25 up to a preset number of times (S25: NO) and repeatedly executing the processes in S19 to S23.

A determination criterion in S25 is not limited to a preset number of times. For example, controller 102 may measure a surface roughness of smooth surface 93 with inspection unit 24, and may perform an affirmative determination in S25 in a case where the surface roughness is equal to or less than a predetermined surface roughness. Alternatively, controller 102 may automatically detect the number of repetitions of S19 to S23 in which the surface roughness is equal to or less than a desired surface roughness by experimentally forming smooth surface 93. Controller 102 may set the number of times used in S25 such that S19 to S23 are executed the number of times detected in advance, that is, the number of times in which the desired surface roughness is equal to or less than a desired surface roughness.

Controller 102 may change, for example, a size of liquid droplets of ultraviolet curable resin 76 ejected in S11 and a size of liquid droplets of second ultraviolet curable resin 76A ejected in S19. That is, controller 102 may execute ejection of multiple ultraviolet curable resins 76 at a time according to a so-called multi-drop method. Consequently, it is possible to more effectively perform smoothing due to a difference between liquid droplets.

Therefore, controller 102 may make a size of liquid droplets of second ultraviolet curable resin 76A ejected in the second ejection process in S19 different from a size of liquid droplets of ultraviolet curable resin 76 (an example of a first curable viscous fluid) ejected in the first ejection process in S11. According to this, by increasing a size of liquid droplets of second ultraviolet curable resin 76A compared with a size of liquid droplets of ultraviolet curable resin 76, it is possible to relatively increase the size of liquid droplets of second ultraviolet curable resin 76A compared with a size, a height, or the like of unevenness 91. Second ultraviolet curable resin 76A can be applied and spread in a wider range to improve the efficiency of the smoothing process. Conversely, by reducing a size of liquid droplets of second ultraviolet curable resin 76A compared with a size of liquid droplets of ultraviolet curable resin 76, second ultraviolet curable resin 76A can easily enter a gap between unevenness 91, and thus smoothing can be performed more effectively. Controller 102 may make a size of liquid droplets of ultraviolet curable resin 76 in S11 and a size of liquid droplets of second ultraviolet curable resin 76A in S19 the same as each other.

Next, when the layer (smooth surface 93) of second ultraviolet curable resin 76A having a desired thickness or shape is formed (S25: YES), controller 102 forms a metal wiring on smooth surface 93. Controller 102 forms a metal wiring at a predetermined position on smooth surface 93, for example, based on three-dimensional data of control program 107. Specifically, in a third ejection process in S27, controller 102 controls ink jet head 75 to eject metal ink 77 in a thin film form on smooth surface 93 of insulating layer 86 (refer to FIG. 11). In the third curing process in S29, controller 102 causes heater 82 to heat and bake metal ink 77 ejected on smooth surface 93 (refer to FIG. 12). In S31, controller 102 determines whether metal wiring 95 having a desired thickness or shape has been formed. For example, controller 102 performs a negative determination in S 31 up to a preset number of times (S31: NO), and repeatedly executes S27 and S29 to form desired metal wiring 95. Desired metal wiring 95 described herein is metal wiring 95 that satisfies a required thickness, shape, or electrical characteristics. When S27 and S29 are repeatedly executed up to the preset number of times, controller 102 performs an affirmative determination in S31 (S31: YES), and executes S33. Consequently, it is possible to shape insulating layer 86 (wiring board) in which metal wiring 95 is formed on smooth surface 93.

Here, when metal ink 77 is ejected and cured on surface 86A on which unevenness 91 is formed to form metal wiring 95, a thickness of metal wiring 95 is made nonuniform due to unevenness 91. There is concern that failures such as an increase in a resistance value of metal wiring 95, disconnection, and deterioration of high-frequency characteristic may occur. In contrast, in shaping device 10 of the present embodiment, metal wiring 95 having a more uniform thickness can be formed, for example, by reducing a thickness to fine unevenness 91 of surface 86A and ejecting metal ink 77 onto reduced smooth surface 93. As a result, the resistance value of metal wiring 95 can be reduced to a desired value, and thus the occurrence of disconnection can be suppressed.

Controller 102 forms an insulating layer 86 having an insulating property as a cured layer of the present application, and forms metal wiring 95 on smooth surface 93 as a conductor. According to this, it is possible to form metal wiring 95 having improved high-frequency characteristics on insulating layer 86 by making electrical resistance values uniform.

In S33, controller 102 executes other processes. For example, controller 102 controls mounting unit 23 such that an electronic component is disposed on insulating layer 86 to be connected to metal wiring 95. Alternatively, controller 102 may execute the processes from S11 again in a case where further shaping of insulating layer 86 and metal wiring 95 is necessary. Controller 102 may control inspection unit 24 to inspect a completed structure (such as insulating layer 86 on which electronic components are mounted). When S33 is executed, controller 102 finishes the shaping process illustrated in FIG. 3. Consequently, a desired structure can be shaped.

According to the above embodiment, the following advantages can be achieved. Controller 102 of shaping device 10 executes the first ejection process (S11) of ejecting ultraviolet curable resin 76, the planarization process (S13) of planarizing ultraviolet curable resin 76 ejected through the process in S11 with planarization device 78, and the first curing process (S15) of curing ultraviolet curable resin 76 planarized through the process in S13. Controller 102 repeatedly executes S11, S13, and S15 (S17: NO) to form insulating layer 86. Controller 102 executes the second ejection process (S19) of ejecting second ultraviolet curable resin 76A onto surface 86A of insulating layer 86, and the second curing process (S23) of forming smooth surface 93 on surface 86A of insulating layer 86 by curing second ultraviolet curable resin 76A ejected through the process in S19 without planarizing second ultraviolet curable resin 76A with planarization device 78. Controller 102 executes the third ejection process (S27) of ejecting metal ink 77 onto smooth surface 93, and the third curing process (S29) of curing metal ink 77 ejected through the process in S27 to form metal wiring 95 on smooth surface 93.

According to this, insulating layer 86 of which surface 86A is planarized is formed by repeatedly executing the first ejection process (S11), the planarization process (S13), and the first curing process (S15). Fine unevenness that cannot be eliminated by planarization device 78 may be formed on planarized surface 86A of insulating layer 86. Therefore, second ultraviolet curable resin 76A is ejected onto surface 86A of insulating layer 86, and ejected second ultraviolet curable resin 76A is cured without being planarized by planarization device 78. Consequently, second ultraviolet curable resin 76A ejected on surface 86A of insulating layer 86 is spread over the fine unevenness of the surface of insulating layer 86 due to the leveling effect and is smoothed to form smooth surface 93.

Here, in a case where a cured layer (such as insulating layer 86) is formed by repeatedly ejecting and curing the first curable viscous fluid (such as ultraviolet curable resin 76) without using planarization device 78 (that is, without executing the planarization step), a surface of the cured layer rises at the end part or boundary part thereof due to the influence of surface tension, and thus a wave-like surface is formed as a whole. As a result, when a fluid containing metal particles is ejected onto a surface of a cured layer to form a conductor, there is concern that the formed conductor may have a wavy shape, or the fluid may flow along the surface of the cured layer and thus a thickness may be made nonuniform, so that electrical characteristics deteriorate.

Therefore, in shaping device 10 of the present embodiment, insulating layer 86 (an example of a cured layer) having a constant thickness is formed while being planarized. Next, second ultraviolet curable resin 76A is ejected onto surface 86A of formed insulating layer 86 and cured without being planarized, and smooth surface 93 having no unevenness or less unevenness can be formed on planarized insulating layer 86. By ejecting and curing metal ink 77 (an example of a fluid containing metal particles) onto smooth surface 93, metal wiring 95 having a more uniform thickness (having higher electrical characteristics) can be formed on insulating layer 86.

As illustrated in FIG. 2, controller 102 of control device 26 includes first ejection section 110, planarization section 111, first curing section 112, cured layer forming section 113, second ejection section 115, second curing section 116, third ejection section 117, third curing section 118, and heating section 119.

First ejection section 110 and the like are, for example, processing modules realized by executing control program 107 in the CPU of controller 102. First ejection section 110 and the like may be configured by hardware instead of software.

First ejection section 110 is a functional section that causes ink jet head 75 to eject the first curable viscous fluid. Planarization section 111 is a functional section that causes planarization device 78 to planarize the first curable viscous fluid ejected by first ejection section 110. First curing section 112 is a functional section that causes curing section 74 to cure the first curable viscous fluid planarized by planarization section 111. Cured layer forming section 113 is a functional section that repeatedly executes processes in first ejection section 110, planarization section 111, and first curing section 112 to form a cured layer. Second ejection section 115 is a functional section that causes ink jet head 75 to eject the second curable viscous fluid onto surface 86A of the cured layer. Second curing section 116 is a functional section that forms smooth surface 93 on surface 86A of insulating layer 86 by curing the second curable viscous fluid ejected by second ejection section 115 with curing section 74 without planarization by planarization device 78. Third ejection section 117 is a functional section that causes ink jet head 75 to eject a fluid containing metal particles onto smooth surface 93. Third curing section 118 is a functional section that causes curing section 74 to cure the fluid containing metal particles ejected by third ejection section 117 to form a metallic conductor on smooth surface 93. Heating section 119 is a functional section that heats the second curable viscous fluid in the second ejection step.

In the above embodiment, curing section 74 is an example of a curing device. Ink jet head 75 is an example of an ejection device. Ultraviolet curable resin 76 is an example of a first curable viscous fluid. Metal ink 77 is an example of a fluid containing metal particles. Insulating layer 86 is an example of a cured layer. Metal wiring 95 is an example of a conductor. Controller 102 is an example of a control device. S11 is an example of a first ejection step. S13 is an example of a planarization step. S15 is an example of a first curing step. The process of repeatedly executing S11, S13, and S15 is an example of a cured layer forming step. The process in S19 is an example of a second ejection step. The process in S23 is an example of a second curing process. The process in S27 is an example of a third ejection step. The process in S29 is an example of a third curing step. The process in S21 is an example of a heating step.

(3. Others)

The present disclosure is not limited to the above examples, and can be implemented in various forms in which various modifications and improvements are made based on the knowledge of those skilled in the art. The first curable viscous fluid and the second curable viscous fluid of the present application are not limited to ultraviolet curable resin 76, and various curable viscous fluids that are cured by light, heat, or the like may be employed. Therefore, a method of curing the first curable viscous fluid and the second curable viscous fluid is not limited to ultraviolet light. The first curable viscous fluid and the second curable viscous fluid may be different types of curable viscous fluids. The fluid containing metal particles of the present application is not limited to metal ink 77 containing silver, and may employ a fluid containing another metal. In the above embodiment, the degree of smoothness is inspected by measuring a surface roughness of smooth surface 93 with inspection unit 24, but an inspection method is not limited to this. For example, shaping device 10 may measure a resistance value of formed metal wiring 95 to determine the degree of smoothness (quality of shaped metal wiring 95). Controller 102 does not have to execute the heating process (S21) of heating second ultraviolet curable resin 76A. Controller 102 may cure second ultraviolet curable resin 76A without heating. Controller 102 does not have to execute the other processes in S33. For example, controller 102 does not have to execute mounting of electronic components using mounting unit 23 or inspection of a structure using inspection unit 24. In the above embodiment, shaping device 10 for manufacturing a wiring board is employed as a shaping device of the present disclosure, but the present disclosure is not limited to this. As a manufacturing device of the present disclosure, various manufacturing devices for forming a conductor on the first curable viscous fluid and the second curable viscous fluid may be employed. Sizes of liquid droplets of second ultraviolet curable resin 76A and ultraviolet curable resin 76 may be the same.

REFERENCE SIGNS LIST

10 Shaping device, 26 Control device, 102 Controller (control device), 74 Curing section (curing device), 75

Ink jet head (ejection device), 76 Ultraviolet curable resin (first curable viscous fluid), 76A Second ultraviolet curable resin (second curable viscous fluid), 77 Metal ink (fluid containing metal particles), 78 Planarization device, 86 Insulating layer (cured layer), 86A Surface, 93 Smooth surface, 95 Metal wiring (conductor), 110 First ejection section (first ejection step), 111 Planarization section (planarization step), 112 First curing section (first curing step), 113 Cured layer forming section (cured layer forming step), 115 Second ejection section (second ejection step), 116 Second curing section (second curing step), 117 Third ejection section (third ejection step), 118 Third curing section (third curing step), 119 Heating section (heating step)

The invention claimed is:

1. A shaping device comprising:
an ejection device;
a planarization device;
a curing device;
a heater; and
a control device including a processor configured to
cause the ejection device to eject a first curable viscous fluid, cause the planarization device to planarize the ejected first curable viscous fluid, and cause the curing device to cure the planarized ejected first curable viscous fluid to form a cured layer having a surface with an unevenness formed thereon,
determine a size of the unevenness formed on the cured layer,
cause the ejection device to eject a second curable viscous fluid onto the surface of the cured layer, an injection amount of the second curable viscous fluid corresponding to the determined size of the unevenness formed on the surface of the cured layer,
cause the heater to heat the ejected second curable viscous fluid ejected by the second ejection section,
cause the curing device to cure the second curable viscous fluid heated by the heater and ejected by the second ejection section to form a smooth surface on the surface of the cured layer without planarizing the second curable viscous fluid by the planarization device,
cause the ejection device to eject a fluid containing metal particles onto the smooth surface,
cause the curing device to cure the fluid containing the ejected metal particles,
determine whether a metal wiring has been formed on the smooth surface having at least one of a predetermined thickness, shape, or electrical characteristic, and
when it determined that the metal wiring has not been formed, cause the ejection device to eject the fluid containing metal particles and cause the curing device to cure the fluid containing the ejected metal particles.

2. The shaping device according to claim 1, further comprising an inspection unit configured to measure the size of the unevenness formed on the cured layer, wherein the control unit is configured to set the injection amount of the second curable viscous fluid from the size of the unevenness formed on the cured layer measured by the inspection unit.

3. The shaping device according to claim 1, wherein the control unit is configured to set the injection amount of the second curable viscous fluid from a programmed size of the unevenness formed on the cured layer.

4. A shaping method comprising:
providing the shaping device according to claim 1;

a first ejection step of ejecting, by the ejection device, a first curable viscous fluid;

a planarization step of planarizing, by the planarization device, the first curable viscous fluid ejected in the first ejection step;

a first curing step of curing, by the curing device, the first curable viscous fluid planarized in the planarization step;

a cured layer forming step of repeatedly executing the first ejection step, the planarization step, and the first curing step to form a cured layer having a surface with an unevenness formed thereon;

a size determining step of determining a size of the unevenness formed on the cured layer;

a second ejection step of ejecting, by the ejection device, a second curable viscous fluid onto a surface of the cured layer injection amount of the second curable viscous fluid corresponding to the determined size of the unevenness formed on the surface of the cured layer, the second curable viscous fluid being an ultra-violet curable resin;

a heating step of heating, by the heater, the second curable viscous fluid in the second ejection step;

a second curing step of forming a smooth surface on the surface of the cured layer by curing, by the curing device, the second curable viscous fluid ejected in the second ejection step and heated in the heating step without planarizing the second curable viscous fluid by the planarization device;

a third ejection step of ejecting, by the ejection device, a fluid containing metal particles onto the smooth surface;

a third curing step of curing, by the curing device, the fluid containing the metal particles ejected in the third ejection step;

a determining step of determining whether a metal wiring has been formed on the smooth surface having at least one of a predetermined thickness and shape; and when it is determined that the metal wiring having at least one of the predetermined thickness and shape has not been formed, repeating the third ejection step and the third curing step.

5. The shaping method according to claim 4, wherein the first curable viscous fluid is a resin having an insulating property, and in the first curing step, an insulating layer having an insulating property is formed as the cured layer.

* * * * *